United States Patent [19]
Stigler

[11] 3,820,934
[45] June 28, 1974

[54] PARTICULATE MATERIAL PRESSING APPARATUS

[75] Inventor: Anton Stigler, Berchtesgaden, Germany

[73] Assignee: Olin Energy Systems Ltd., County Durham, England

[22] Filed: Oct. 25, 1972

[21] Appl. No.: 300,535

[30] Foreign Application Priority Data
Apr. 6, 1972 Great Britain..................... 15888/72
Apr. 6, 1972 Great Britain..................... 15889/72

[52] U.S. Cl............................. 425/405 H, 425/443
[51] Int. Cl.......................... B30b 5/02, B30b 11/02
[58] Field of Search.......... 425/441, 443, 444, 344, 425/405, 401, 810, 468, 356, 43; 249/178, 180, 184, 185, 186; 164/344, 401

[56] References Cited
UNITED STATES PATENTS

| | | | |
|---|---|---|---|
| 2,152,738 | 4/1939 | Jeffery | 425/405 H X |
| 3,020,589 | 2/1962 | Mantano | 425/443 X |
| 3,049,758 | 8/1962 | Drevalas | 425/441 X |
| 3,193,900 | 7/1965 | Wendt | 425/443 X |
| 3,329,997 | 7/1967 | Rand et al. | 425/810 X |
| 3,343,222 | 9/1967 | Kacalieff | 425/441 |
| 3,354,942 | 11/1967 | Todd et al | 164/344 |
| 3,488,692 | 1/1970 | Masanarioda et al. | 164/401 UX |
| 3,522,838 | 8/1970 | Ott | 164/344 X |
| 3,525,382 | 8/1970 | Devol | 425/437 X |
| 3,537,676 | 11/1970 | Miller | 425/441 X |
| 3,550,198 | 12/1970 | Roberts | 425/405 H X |
| 3,591,903 | 7/1971 | Bowles | 425/441 X |

*Primary Examiner*—J. Howard Flint, Jr.
*Attorney, Agent, or Firm*—Donald R. Motsko; William W. Jones; H. Samuel Kieser

[57] ABSTRACT

Apparatus for isostatically pressing particulate material into coherent bodies. The molding body includes three parts, a basal part, an intermediate part and a top closure part. The top closure part is displaced from the basal and intermediate parts during filling of the molding cavity. After molding, the top closure and intermediate parts are displaced from the basal part leaving the molded body exposed thereon. A gripper mechanism is then actuated to grasp the molded part and remove the latter from the basal part of the mold body.

10 Claims, 5 Drawing Figures

PARTICULATE MATERIAL PRESSING APPARATUS

This invention relates to apparatus for isostatically pressing bodies from particulate material using the dry bag technique.

One of the principal difficulties in designing such apparatus has been to make it versatile so that it is readily adapted for making a wide variety of shapes e.g. spheres, tubes and the like. We have found according to the invention that a more versatile apparatus can be made by constructing the mould in three or more parts but usually three parts. Thus, in our preferred apparatus (which is usually arranged vertically) the mould is formed by an upper tool, a middle tool and a lower tool. In this way the mould can be charged with the middle and lower tools assembled, closed with the upper tool, pressurized, relieved, and opened by moving both the middle and upper tools away from the lower tool thus leaving the moulded body exposed and resting on the lower tool. The middle and upper tools are thus movable and the lower tool is fixed. With this arrangement, means may be provided for optionally securing the middle tool to the upper tool and we have found that a fluid pressure operated piston-cylinder arrangement is suitable for this purpose.

This invention further relates to gripper mechanisms and particularly, though not exclusively, a gripper for removing moulded articles from isostatic moulding apparatus.

According to the invention a gripper has arms resiliently urged towards each other and transverse wedge means for opening the arms. Preferably the wedge means is a pin or the like having different cross-section dimensions at points along its length. With this arrangement, it is possible for the wedge to be operated by cams, abutments or the like so that its operation is integrated with the movement of the grippers as a whole. For example, the gripper arms may be mounted for rotation about a rotary axis and the wedge means forced in one direction by an abutment at one end of the gripper movement and in the other direction by an abutment at the other end of the gripper movement.

An embodiment of the invention is illustrated by way of example in the accompanying drawings in which:

FIG. 4 is a view of part of the mechanism of FIG. 2 in the direction of the arrow Y;

FIG. 5 is a section on the line V—V of FIG. 2.

Figure 1:
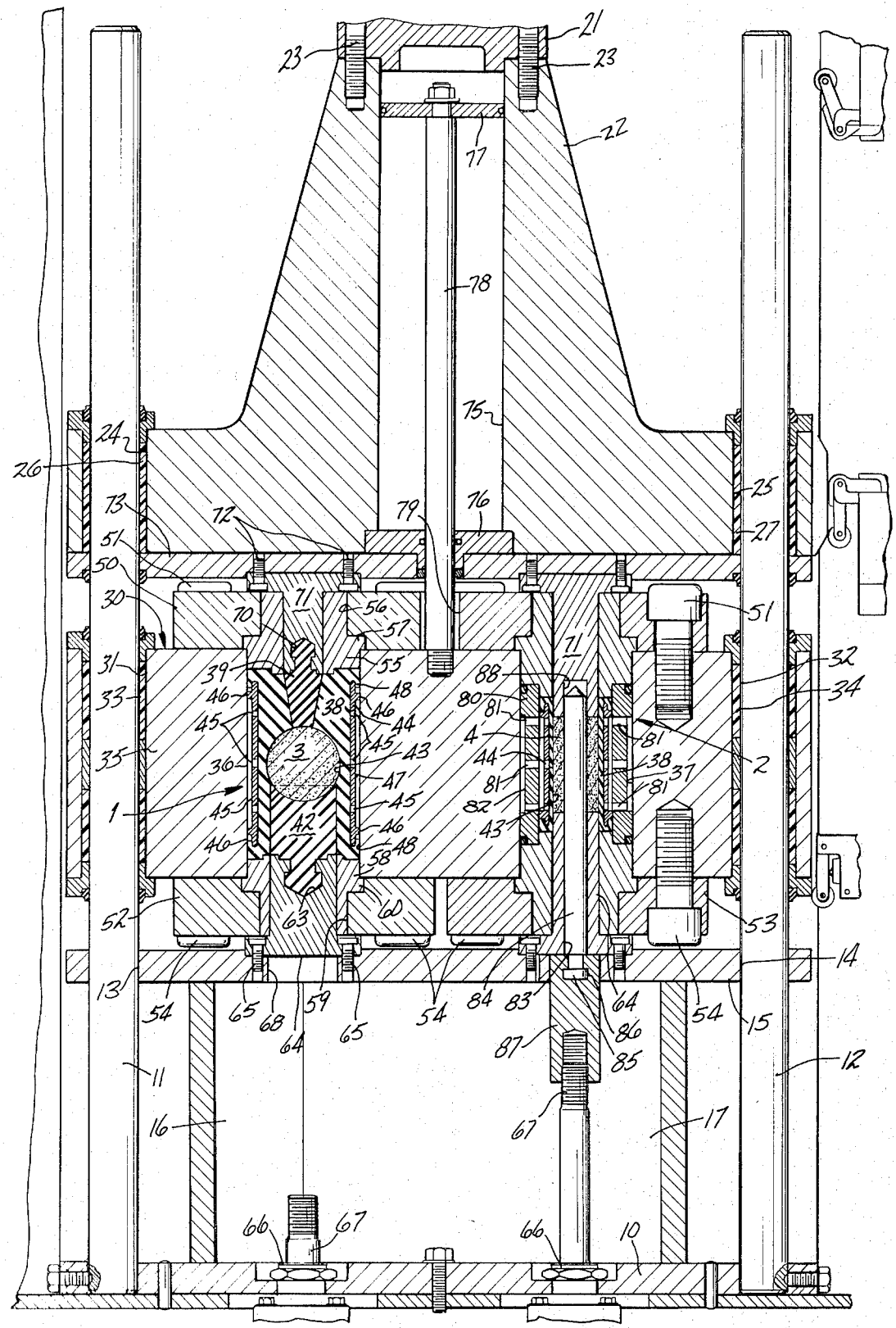
FIG. 1 is a longitudinal vertical section through apparatus according to the invention.

Referring now to FIG. 1 in particular, there are illustrated two moulds generally indicated at 1 and 2. In practice they will normally be adapted to produce similar articles but for the purposes of illustration, the mould 1 is shown set up to produce a spherical article 3 and the mould 2 is shown set up to produce a tubular article 4.

The apparatus comprises a base 10 from which circular pillars 11 and 12 extend upwardly. These pillars 11 and 12 are rigidly secured in any convenient way to provide shafts on which working parts of the apparatus may vertically slide. The pillars 11 and 12 extend through circular apertures 13 and 14 in a fixed table 15 which extends between them and which is carried by semi-cylindrical supports 16, 17 which in turn are carried by the base 10. A fixed hydraulic ram assembly 20 (FIG. 2) has a piston rod 21 to the lower end of which an adapter 22 is secured by bolts 23. The adapter 22 has bores 24, 25 through which the pillars 11 and 12 pass, the bores 24, 25 having bushings 26, 27 secured therein to facilitate vertical sliding movement of the adapter 22. A middle tool assembly 30 is mounted between the adapter 22 and the table 15 and has bores 31, 32 for receiving the pillars 11, 12. The bores 31, 32 have bushings 33, 34 therein to facilitate sliding movement on the pillars 11, 12.

The middle tool assembly comprises a main block 35 having bores 36, 37 which accommodate the moulds 1, 2. The mould 1 comprises a tubular middle mould member 38 of resilient material. The upper end of the mould member 38 has an internal taper to receive an upper mould member 39 in the form of a plug of resilient material. The lower end of the mould member 38 is also internally tapered but is of greater diameter than the upper end of the mould member 38. It receives a lower mould member 42 in the form of a tapered plug of resilient material. The mould members 38, 39, 42 together define a spherical mould chamber 43.

Around the longitudinally central part of the mould member 38 there is disposed a metal sleeve 44 having apertures 45 to allow pressure fluid to pass therethrough. The sleeve 44 has lugs 46 disposed around its periphery at each end to center it in the bore 36 and thereby form a fluid pressure manifold 47. The ends 48 of the sleeve 44 are embedded in the mould member 38 as shown.

The main block 35 of the middle tool assembly has a cap plate 50 secured thereto by bolts 51 and base plates 52, 53 secured thereto by bolts 54. An upper tubular mould end block 55 extends through an aperture 56 in the cap plate 50 into the bore 36. An integral ridge 56 on the block 55 is held between the cap plate 50 and the main block 35 thus securing the end block 55 against movement. A lower tubular mould end block 58 extends through an aperture 59 in the base plate 52 and into the bore 36. An integral ridge 60 on the block 58 is held between the base plate 52 and the main block 35 thus securing the end block 58 against movement. The tubular end blocks 55, 58 thus secure the mould member 38 in position in the bore 36.

The lower mould member 42 is shaped to enter and be held in a recess 63 in a lower mould tool 64 secured to the table 15 by bolts 65. An air cylinder 66 is mounted below the base 10 with its rod 67 directly below an opening 68 in the table 15 below the tool 64 but is not used in this mode of operation.

Figure 2:
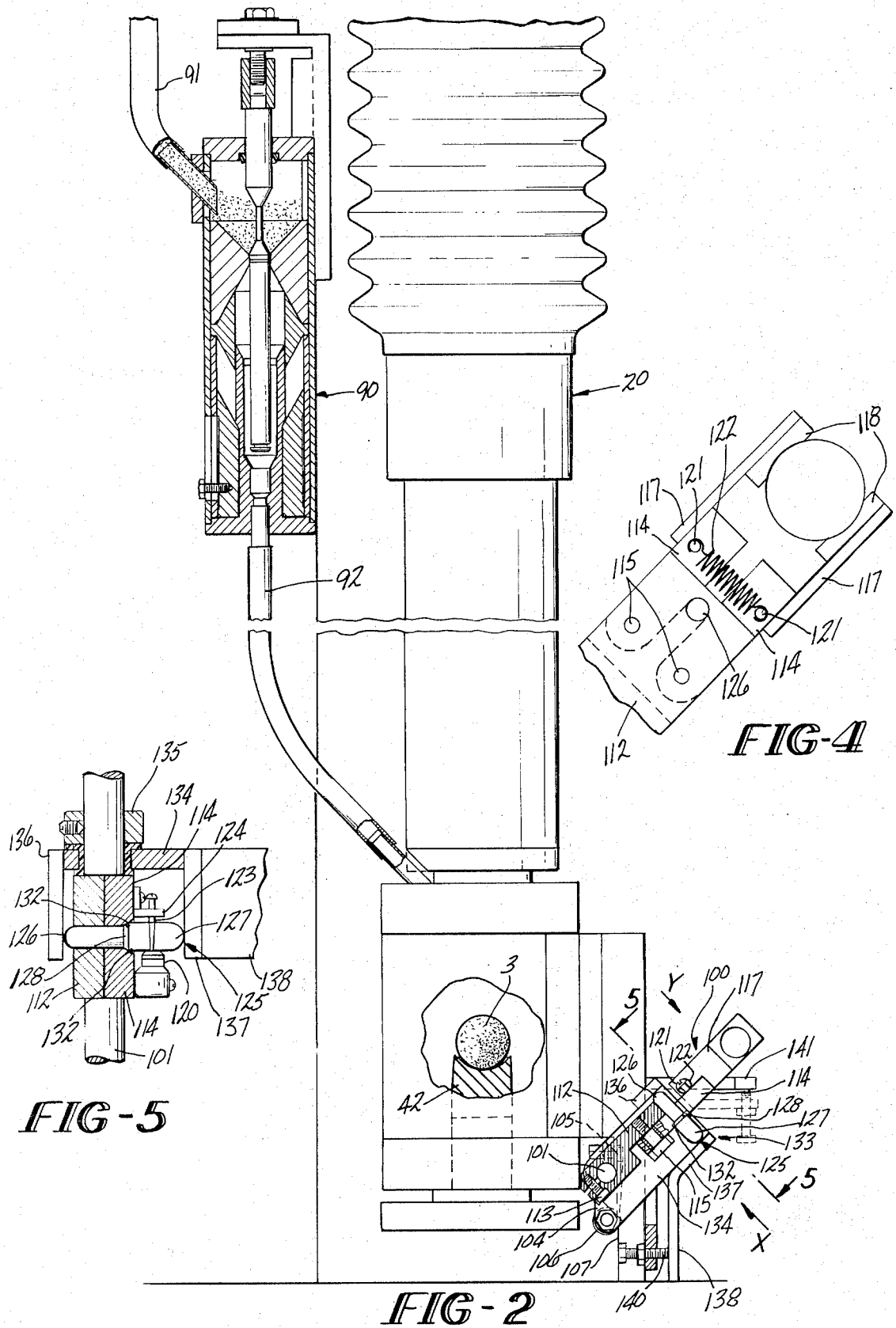
FIG. 2 is a diagrammatic side elevation of a machine incorporating the apparatus of FIG. 1 showing in particular an ejector mechanism and a particulate material dispenser.

The upper mould member 39 is shaped to enter and be held in a recess 70 in an upper mould tool 71 secured by bolts 72 to a face plate 73 secured to the underside of the adapter 22. The adapter 22 has a central cylindrical bore 75 closed at the upper end by the piston rod 21 and at the lower end by a sealing washer 76 held in place by the face plate 73. A piston 77 is sealingly slidable in the bore 75 and is carried by a piston rod 78 which passes through the sealing washer 76 and an aperture 79 in the cap plate 50 to be screwed into the main block 35 of the middle tool assembly. The bore 75 can be pressurized with air below the piston 77 through an opening (not shown) so that the middle tool assembly 30 moves with the adapter 22. In operation the adapter 22 and, thus the upper mould tool 71 are raised for charging the mould. At this stage the adapter bore 75 is not pressurized so the middle tool assembly 30 remains resting on the table 15. The mould is charged (by means hereinafter described) and the adapter 22 and upper mould tool 71 are lowered into the FIG. 1 position. The charge is then pressed in the usual manner by supplying pressure fluid to the manifold 47 through conduits (not shown). After decompression, the adapter bore 75 is pressurized and the adapter 22 is raised carrying both the upper mould tool 71 and the middle tool assembly upwards away from the lower mould tool 64. This leaves the spherical moulded product resting exposed on the lower mould member 42 as shown in FIG. 2. It is then removed by an ejector which will be hereinafter described.

The bore 37 in the main block 35 is of the same diameter as the bore 36 but the arrangement therein is somewhat different. The middle mould member 38 now has a uniform bore which is closed in the assembled condition by the upper and lower mould tools 71, 64. The mould member 38 and sleeve 44 are now of smaller outside diameter and a spacer sleeve 80 is provided. This sleeve 80 has apertures 81 and a manifold recess 82. The lower mould tool 64 has a central bore 83 in which a mandrel 84 is slidable. The lower end of the mandrel 84 has a bolt head 85 held in a complementary transverse slot 86 in the top of an adapter 87 screwed to the rod 67 of the air cylinder 66. A recess 88 is provided for the end of the mandrel 84 in the upper mould tool 71.

The operation of the mould 2 is essentially the same as that of the mould 1. During the filling operation, the mandrel 84 is in its lower retracted position with its tapered upper end level with the lower end of the mould chamber 43. After the correct charge has been placed in the chamber 23, the cylinder 66 is energized to raise the mandrel 84 as shown in the drawing and thereby displace the charge into a cylindrical configuration. This helps to overcome a frequent problem in moulding cylindrical articles, which is to obtain a uniform distribution in the longitudinal direction. The operation continues as for mould 1 except that in the final stage before ejection of the moulded body, the mandrel 84 is again lowered to strip the moulded body from it.

An adjustable particulate material dispenser 90 is shown in FIG. 2. It is substantially as described in our copending patent application Ser. No. 251,044, filed May 8, 1972, now abandoned and accordingly will not be described in detail here. The particulate material is fed in through a flexible tube 91 and is dispensed through a flexible tube 92 to the main block of the middle tool assembly.

Figure 3:
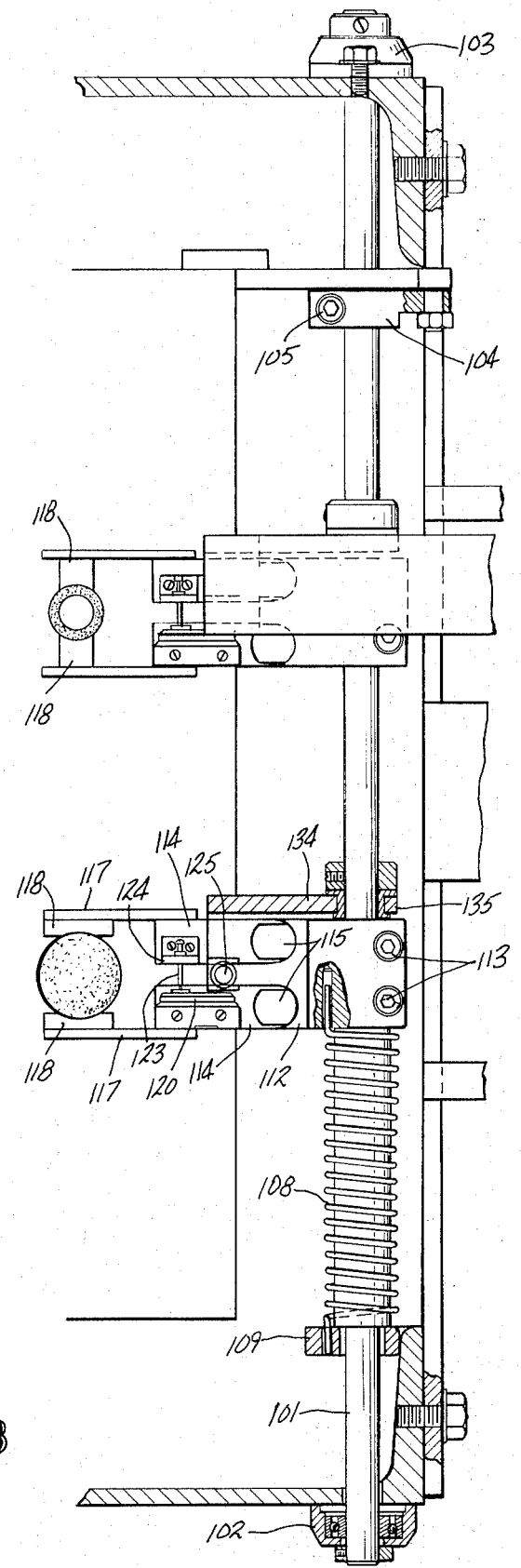
FIG. 3 is a view of the ejector mechanism of FIG. 2 in the direction of the arrow X.

Referring now to FIGS. 2 and 3, an ejector mechanism 100 comprises a rotary shaft 101 passing in front of the moulds 1 and 2 and mounted in bearings 102, 103 in the main frame of the moulding apparatus. An arm 104 is clamped to the shaft 101 by a bolt 105 and carries a roller 106. The roller 106 engages a cam track 107 movable with the main block of the middle tool assembly such that the shaft 101 moves anticlockwise approximately 90° (as seen in FIG. 2) when the middle tool assembly is raised to expose the moulded body. The shaft 101 is urged in this direction by a helical spring 108 thereon which extends between a fixed bracket 109 and an ejector arm 112 clamped to the shaft 101 by bolts 113. As shown in FIGS. 2 to 5, the ejector arm 112, which is arranged to unload spherical moulded bodies from mould 1, has two flat levers 114 pivotally secured thereto by bolts 115, the bearing arrangement of one of the levers 114 being shown in section in FIG. 2. The levers 114 have extensions 117 which have gripper pads 118 on the insides thereof for gripping moulded bodies in the manner of tongs. The levers 114 have pins 121 thereon between which there extends a tension spring 122 arranged to urge them towards each other. In operation the closeness to which they approach each other is determined by the size of the moulded body and an adjustable screw 123 mounted in a bracket 124 on one lever is arranged to contact a microswitch 120 on the other lever and stop the apparatus if no moulded body is present and the levers move too close together (the parts 123, 124 and 120 are omitted from FIG. 2). The levers 114 are opened by a wedge pin 125 which has a small diameter end 126, a large diameter end 127 and a tapered intermediate portion 128. The small diameter end 126 is slidably mounted in a hole in the ejector arm 112 and (as shown in FIG. 2) extends between the levers 114. The levers 114 have bevels 132 at this point and it will be seen that the levers 114 can be moved apart by forcing the large diameter end 127 of the pin between them. The pin 125 is operated by a yoke 133 comprising a radially extending plate 134 rotatably mounted on the shaft 101 by an adjustable friction bearing 135 and axially extending plates 136, 137 secured thereto. The plate 137 has an angled extension 138 arranged to contact stops 140, 141 at the respective ends of the movement of the arm 112 so that the wedge pin 125 is displaced. Thus the ejector grips the moulded article when it has swung beneath the middle tool assembly and releases the moulded article when it has swung out again. As shown in the drawings, the ejector is about to release a moulded body. For the tube 4, the gripper pads 118 are of a slightly different shape.

It will be readily appreciated that the molding assembly of this invention can be readily adapted to form compacted bodies having a great variety of shapes and configurations. Use of a three part cavity-forming tool assembly permits simplified filling of the mold cavity with material to be compacted by displacement of the top mold part, and further permits simplified removal of the compacted body by displacement of the top two mold parts. Movement of a body-removing assembly can be readily coordinated with the displacement of the top two mold parts.

Since many changes and variations of the disclosed embodiments of the invention may be made without departing from the inventive concept, it is not intended to limit the invention otherwise than as required by the appended claims.

What is claimed is:

1. Apparatus for pressing particulate material into coherant bodies, said apparatus comprising:
   a. means forming an upper mold member;
   b. means forming an intermediate mold member;
   c. means forming a lower mold member, said mold members being arranged in juxtaposition so as to provide a molding cavity for the reception of a charge of particulate material to be compacted into a coherant body having the general configuration of said molding cavity;

d. an adapter having a movable first part connected to said upper mold member and operative when moved to displace said upper mold member from said intermediate and lower mold members to open said molding cavity for charging thereof with particulate material;

e. said adapter having a movable second part connected to said intermediate mold member and operative when moved to displace said intermediate mold member from said lower mold member to expose a compacted body positioned on said lower mold member for removal therefrom;

f. means for sequentially effecting movement of said first adapter part relative to said second adapter part to open and close said molding cavity for charging thereof and then effecting concurrent movement of said first and second adapter parts to cause coincidental displacement of said upper and intermediate mold members from said lower mold member after compaction of a charge of particulate material in said molding cavity; and g. a single ram means connected to said adapter for moving the latter.

2. The apparatus of claim 1, wherein said intermediate mold member is a resilient tubular element.

3. The apparatus of claim 2, wherein said upper and lower mold members are resilient elements closing off open ends of said resilient tubular element.

4. The apparatus of claim 1, wherein one of said upper and lower mold members includes a passage; a mandrel extending through said passage into said molding cavity; and means connected to said mandrel for withdrawing the latter from said molding cavity after compaction of a body therein to free the body from adhesion to said mandrel and to permit removal of the body from said molding cavity.

5. Apparatus for pressing particulate material into coherant bodies, said apparatus comprising:

a. a frame;

b. a first mold member immovably mounted on said frame, said first mold member forming the portion of a molding cavity upon which a molded body rests under the influence of gravity;

c. second and third mold members slidably mounted on said frame, said second and third mold members forming the remainder of said molding cavity when positioned adjacent each other and said first mold member;

d. an adapter having a first part connected to one of said second and third mold members and operative to move said one mold member from a first position adjacent the remaining mold members to a second position offset from the remaining mold members and return;

e. said adapter having a second part connected to the other of said second and third mold members and operative to move said other mold member from a first position adjacent said first mold member to a second position offset from said first mold member and return;

f. means for effecting periodic connection and disconnection between said adapter parts for effecting sequentially the steps of:

i. moving said one mold member from its first position to its second position to open said molding cavity to permit introduction thereinto of a charge of particulate material;

ii. returning said one mold member from its second position to its first position to close said molding cavity; and iii. moving said one mold member and said other mold member from their respective first positions to their respective second positions to expose a compacted body positioned on said first mold member to permit removal of the compacted body therefrom; and g. a single ram means connected to said adapter for moving the latter.

6. An apparatus for forming compacted bodies from particulate material, said apparatus comprising:

a. a frame;

b. a lower mold member secured to said frame;

c. an intermediate resilient mold member vertically slidably mounted on said frame;

d. an upper mold member vertically slidably mounted on said frame, said lower, intermediate, and upper mold members being positionable adjacent each other to provide a closed molding cavity;

e. means connected to said intermediate mold member to apply compressive fluid pressure to said intermediate mold member to compact a particulate material charge positioned in said molding cavity;

f. movable adapter means having separate parts, one of which is connected to said intermediate mold member and the other of which is connected to said upper mold member for effecting sequentially the steps of:

i. sliding said upper mold member upwardly away from said intermediate mold member to open said molding cavity to permit introduction thereinto of a charge of particulate material;

ii. sliding said upper mold member downwardly to a position adjacent said intermediate mold member to close said molding cavity to permit compaction of the charge of particulate material; and iii. sliding said upper and intermediate mold members upwardly away from said lower mold member to expose a compacted body resting on said lower mold member to permit removal of the compacted body from the lower mold member;

g. means for periodically interconnecting said adapter parts to provide concurrent movement of said adapter parts and for periodically disconnecting said adapter parts to provide movement of only said other of said adapter parts; and h. a single ram means connected to said adapter means for moving the latter.

7. The apparatus of claim 6, wherein said lower mold member includes a through aperture; a mandrel extending through said aperture and projecting into said molding cavity; and means connected to said mandrel to reciprocate the latter whereby said mandrel is withdrawn from said molding cavity to disengage said mandrel from a compacted body in said molding cavity and free the body for removal from said lower mold member.

8. In an apparatus for pressing particulate material in a molding cavity, said apparatus being of the type having a first mold part forming a top closure for the molding cavity, a second mold part forming a side wall of the molding cavity, and a third part forming a bottom wall of the molding cavity; means for opening said molding cavity for charging of particulate material therein and for subsequent removal of a pressed part therefrom, said means comprising a reciprocating ram assembly; adapter means secured to said ram assembly for reciprocating movement therewith, said adapter means comprising a first part secured to said first mold part, and a second part secured to said second mold part, and selective means for imparting reciprocating movement to said first adapter part and said first mold part away from said second and third mold parts to open said molding cavity for charging, and alternatively for imparting concurrent reciprocating movement to said first and second adapter parts and said first and second mold parts away from said third mold part to open said molding cavity for removal of a pressed part therefrom.

9. The apparatus of claim 8, wherein said first adapter part is a housing having a bore, and said second adapter part is a piston slidably mounted in said bore.

10. The apparatus of claim 9, wherein said selective means comprises means for selectively pressurizing said bore to hold said piston in place within said bore when said housing is moved to cause said piston to move with said housing, and for selectively depressurizing said bore to release said piston for slidable movement within said bore when said housing is moved.

* * * * *